United States Patent

[11] 3,625,117

| [72] | Inventor | William N. Tazelaar<br>Elyria, Ohio |
|---|---|---|
| [21] | Appl. No. | 877,741 |
| [22] | Filed | Nov. 18, 1969 |
| [45] | Patented | Dec. 7, 1971 |
| [73] | Assignee | Bendix-Westinghouse Automotive Air<br>Brake Company<br>Elyria, Ohio |

[54] MECHANICAL RELEASE MEANS FOR SPRING APPLIED, FLUID PRESSURE RELEASED ACTUATORS
2 Claims, 3 Drawing Figs.

[52] U.S. Cl. .................................................. 92/130,
 92/63, 92/64
[51] Int. Cl. .................................................. F01b 19/02,
 F01b 31/00
[50] Field of Search .......................................... 92/63, 64,
 128, 130

[56] References Cited
UNITED STATES PATENTS

| 3,176,594 | 4/1965 | Cruse | 92/64 X |
|---|---|---|---|
| 3,176,870 | 4/1965 | Cruse | 92/64 X |
| 3,291,004 | 12/1966 | Stevenson et al. | 92/64 X |
| 3,302,536 | 2/1967 | Fites | 92/64 X |

Primary Examiner—Martin P. Schwadron
Assistant Examiner—Allen M. Ostrager
Attorney—Scrivener, Parker, Scrivener and Clarke ABSTRACT: A threaded rod carried by a spring applied actuator and extending rearwardly into a fixed cylindrical socket of greater diameter than the shaft and having a shoulder at the forward end of the socket, a nut carried on the threaded shaft within the socket and having a cylindrical bearing surface engaging the socket wall and tool receiving means engageable through the open rear end of the socket to rotate the nut against the shoulder to draw the shaft and actuator against the opposing force of the spring.

PATENTED DEC 7 1971

3,625,117

INVENTOR
WILLIAM N. TAZELAAR

Scrivener Parker Scrivener + Clarke
ATTORNEYS

MECHANICAL RELEASE MEANS FOR SPRING APPLIED, FLUID PRESSURE RELEASED ACTUATORS

DESCRIPTION OF THE INVENTION

This invention relates to fluid pressure actuators and more particularly to brake applying actuators of the type comprising a fluid pressure applied service brake actuator and a tandemly mounted spring applied, pressure released emergency brake actuator which operates to apply the brakes by spring force upon dimunition of predetermined spring brake release pressure.

Brake actuators of the type to which the present invention applies are well known. When the spring brake is applied under no-air conditions, that is to say, where air pressure is not available to return the spring brake piston to its release position, a problem exists in providing mechanical means for drawing the release piston against the force of the spring to mechanically release the brake. Generally, the problem has been solved by the provision of a threaded shaft which is coaxial with the spring brake push plate with the shaft extending rearwardly out of the spring brake housing for engagement by a nut which is rotated by a socket wrench against a shoulder surrounding the threaded shaft so that the push plate, spring brake release piston and associated mechanism are moved against the force of the spring in a release direction until the brakes are released. Though the prior mechanical release systems operate with reasonable satisfaction they are subject to a number of problems, among which are: the problem of sealing the threaded release shaft from road dirt; a problem of machining the interior surface of an elongated sleeve so as to engage a complementary part on the shaft to insure that the latter does not rotate with the nut when it is rotated to release the brake; and a problem of guiding and supporting the release shaft so that there is no tendency to cock and impede the release or application of the spring brake, particularly during normal parking.

The broad object of the present invention is to provide mechanical means for releasing s spring applied, pressure released actuator which provides a solution to the several problems of prior release arrangements and particularly a solution to those problems enumerated above.

DETAILED DESCRIPTION OF THE DRAWINGS

Figures 1, 2, 3:
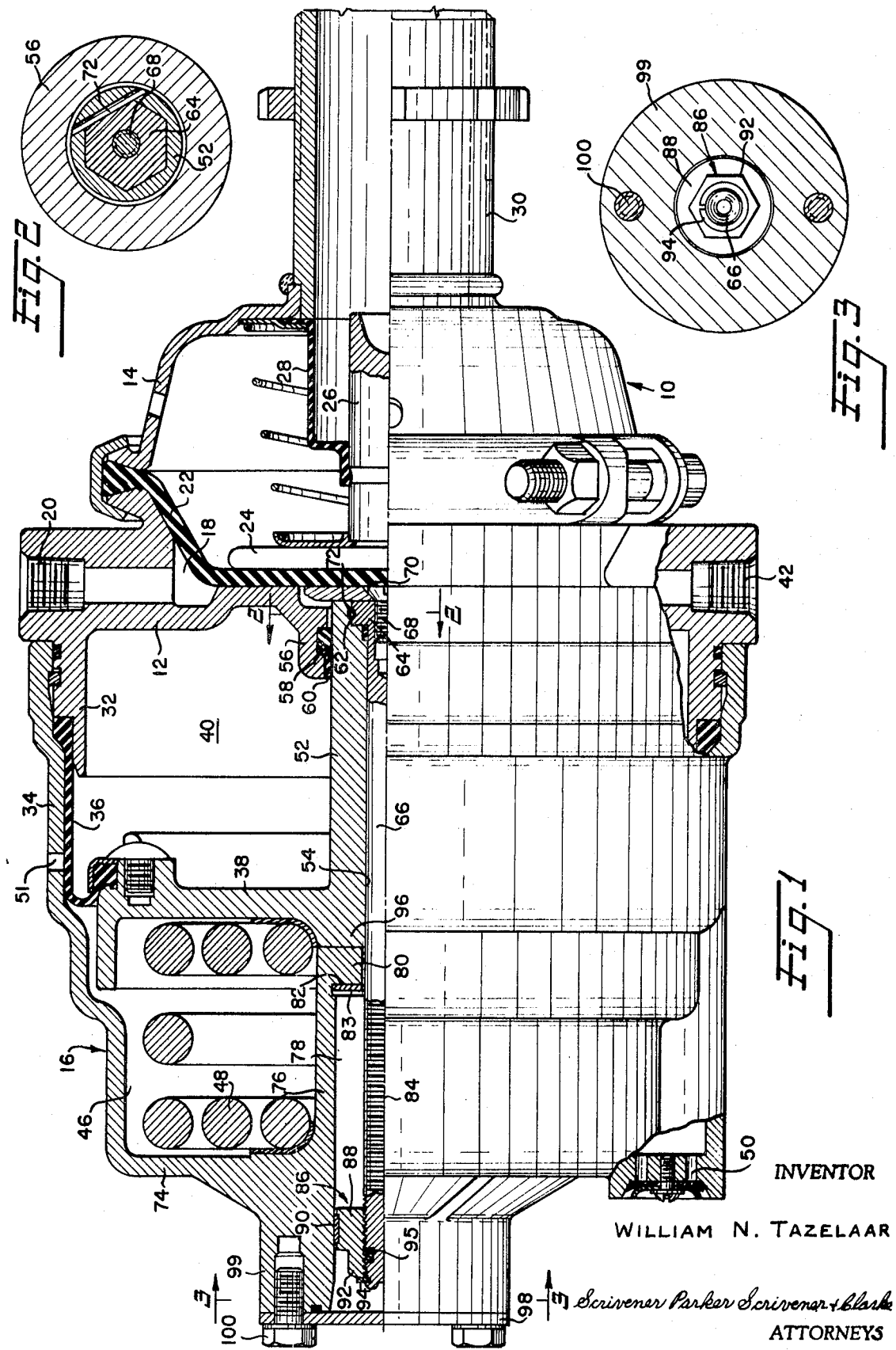
FIG. 1 is a horizontal view, partly in elevation and partly in cross section of a combined service and spring brake actuator incorporating features of the invention.
FIG. 2 is a vertical cross-sectional view taken substantially on the line 2—2 of FIG. 1.
FIG. 3 is a vertical cross-sectional view taken substantially on the line 3—3 of FIG. 1.

Referring now to the drawings, the numeral 10 designates broadly the housing of a combined service brake and spring brake actuator. The housing is divided by a central wall 12 into a service actuator part 14 and a spring actuator part 16. The service part 14 includes a pressure chamber 18 which is adapted to be connected to the usual brake pedal by way of a port 20. When service pressure is delivered to the pressure chamber 18 it operates on a diaphragm 22 to exert a brake applying force on a push plate 24 and plunger 26 which is moved to the right in FIG. 1 to operate a brake rod (not shown) to apply the brake in a manner well-recognized in the art. The service actuator 14 may include a boot 28 and a hollow sleeve 30 to prevent the ingress of dirt and moisture, these members forming no part of the present invention.

Integral with the wall 12 is a stepped lip 32 which is telescopically received within the annular opening defined by the open end of a hollow spring brake container 34 which is divided by a diaphragm 36 and a piston portion 38 into a pressure chamber 40, adapted to be connected to a source of emergency fluid pressure through a port 42, and a spring chamber 46 containing a brake applying spring 48 and is connected to atmosphere through a check valve 50 which serves to release air in the spring chamber when the piston is moved to release position. An opening 51 is also provided through the cylinder to prevent a vacuum in the spring chamber from impeding movement of the piston 38 to brake applied position. The opening 51 is positioned so that in the release position of the drawing, the diaphragm 36 blocks the opening 51 to prevent the ingress of dirt into the spring chamber.

Integral with the piston 38 is a forwardly extending sleeve 52 containing a cylindrical central passage 54 which extends rearwardly through the piston 38 as shown. The sleeve 52 projects forwardly into the service pressure cavity 18 through a rearwardly extending hollow boss 56 integral with the wall 12 with the boss 56 being internally grooved to receive an O-ring 58 which slidingly and sealingly engages the outer surface of the sleeve 52. Also received within the groove containing the O-ring 58 is the flange of a plastic bearing member 60 whose inner surface slidably engages the outer surface of the sleeve.

The right-hand end of the sleeve 52 is provided with a hex-shaped recess 62 whose cross-sectional dimension is substantially greater than the diameter of the internal passage 54 through the sleeve. Nonrotatably received within the hex-shaped recess 62 is the hex-shaped end flange 64 of a release rod or shaft 66 which extends axially rearwardly through the passage 54 in the sleeve and attached to the right-hand end of the sleeve and shaft by a machine screw 68 is a push plate 70 which, upon dimunition of release pressure in the spring brake release cavity 40 is moved by expansion of spring 48 against piston 38 into engagement with the service diaphragm 22 to move it, the push plate 24, and the plunger 26 to the right to apply the brakes. The hex-shaped end 64 of the rod 66 is retained in the hex-shaped recess 62 of the sleeve 52 by means of a straight retaining pin 72 more particularly shown in FIG. 2.

The rear wall 74 of the spring brake container 34 is provided with a forwardly extending sleeve 76 containing an elongated cylindrical socket 78 whose internal diameter is substantially greater than the diameter of the shaft 66 which extends into the socket 78 through a reduced diameter part 80 defining a shoulder 82 at the forward end of the socket which may be engaged by a bearing washer 83. As can be seen, the rear end of the socket 78 is open and the rear end of the shaft 66 is threaded at 84 and when sufficient pressure exists in the spring brake release cavity 40 to move the spring brake piston 38 and spring 48 to the brake release position of the drawing, the threaded end 84 of the shaft 66 extends a substantial distance into the socket 78.

Threadedly received on the rear end of the threaded part 84 of the shaft 66 is a brake release nut 86 constructed in accordance with the invention. The nut comprises a cylindrical part 88 whose outer surface is annularly recessed to receive a plastic bearing 90 of nylon or the like which slidably engages the internal wall of the socket 78. On the side of the nut 88 facing the rear open end of the socket 78 is a hex-shaped boss 92 whose cross-sectional dimension is substantially less than the diameter of the cylindrical part 88 of the nut whereby sufficient space is left between the outer surface of the hex part 92 and the inner wall of the socket 78 so that a socket wrench may be engaged with the part 92 to rotate the nut 86 with respect to the shaft 66. The extreme rear end of the shaft 66 is annularly recessed to receive a snap ring 94 which positively prevents the accidental removal of the nut 86 and a nylon pellet 95 prevents movement sue to vibrations.

When the spring brake is in its fully released position of the drawing, a central boss 96 on the rear or nonpressure side of the piston 38 engages the right-hand side of reduced diameter part 80 of the sleeve 76 to provide a limit stop in a release direction for the spring brake and with the parts in this position the left-hand end of the shaft 66 remains fully housed within the socket 78 whose open rear end can thus be entirely protected from dirt and water by the use of a cover 98 which is releasably connected to a necked part 99 of the end wall 77 by means of a pair of machine screws 100.

In operation, assuming normal pressure conditions in the emergency and service reservoirs, when release pressure is admitted to the spring brake release cavity 40 the spring brake release piston 38 is moved to the left to compress the spring 48 and release the brakes. So long as normal conditions prevail, the spring brake is retained in its released position and the brakes are operated in the usual way by the admission and release of service pressure to and from the service cavity 18.

Should there be a diminution of the pressure in the spring brake release cavity 40 below a predetermined value so that the pressure force is less than the opposite force exerted by the spring 48, the latter will expand to operate against the piston 38 and apply the brakes through the sleeve 52 and push plate 70 as previously described.

After the spring brakes have been thus applied, should there be no additional emergency pressure available for admission to the release chamber 40 to again move the piston to the released position, in that event in order to release the brakes, the operator will remove the cover 98 from the neck 99 of the container 34 and insert into the socket 78 an elongated socket wrench having sufficient length to engage the hex-shaped boss 92 of the nut 86 which will, when the spring brake is applied, be disposed near the right-hand end of the socket 78 and in close adjacency to the washer 83 and shoulder 82. After the operator has engaged the wrench with the boss 92, should he accidentally attempt to turn the nut 86 in the wrong direction, it will move into tight abutment with the snap ring 94 and the operator will thus realize that he should be rotating the nut in the opposite direction to effect brake release. As he continues to turn the nut 86 its right-hand end will engage the washer 83, which serves as a bearing, and continued rotation of the nut against the washer and in turn the shoulder 82 will cause the shaft 66 to be drawn to the left. As previously explained, the shaft 66 is prevented from rotating with the nut 86 through engagement of the hex-shaped end 64 at the right-hand end of the shaft 66 with the hex-shaped recess 62 in the end of the sleeve 52 integral with the spring brake release piston 38. As the operator continues to rotate the nut 86, the shaft 66 is brought further and further to the left until eventually it has moved sufficiently far to enable the return springs of the brake to move them to their fully released position.

When normal pressure conditions have been restored on the vehicle and release pressure has been admitted to the cavity 40 the operator may then turn the nut 86 in the opposite direction until it has been restored to the position of FIG. 1 in engagement with the snap ring 94. Thereafter, the operator may replace the cover plate 98 and proceed with normal operation of the brakes.

From the foregoing description, it will be seen that the present invention affords an efficient spring brake release mechanism which is capable of being at all times entirely enclosed and protected from dirt and water. Furthermore, it will be seen that the cylindrical part 88 and bearing 90 of the release nut 86 afford a guide for the release shaft 66 as it is reciprocated by and with the release piston 38 during parking and also during movement of the shaft in a releasing direction by rotation of the nut 86. It will also be noted that by the use of the hex head 64 on the end of the shaft 66 to prevent rotation of the shaft with the nut 88 the need for providing expensive hex-shaped walls throughout the length of the internal passage in the sleeve 52 is entirely eliminated.

What is claimed is:

1. A fluid pressure brake actuator including a housing having front and rear walls, a fluidtight movable wall in said housing defining, between front and rear walls respectively, a fluid pressure chamber and a spring chamber, a spring in said spring chamber operating on the movable wall to urge it in an actuating direction towards said front wall, an actuating member centrally carried by said movable wall and extending axially outwardly through said front wall for operative engagement with a device to be actuated upon expansion of said spring, said fluid pressure actuator further comprising mechanical means for retracting said movable wall in the absence of sufficient fluid pressure in said fluid pressure chamber including a threaded member carried by and secured to said actuating member and extending axially rearwardly of said movable wall in the direction of the rear wall, a sleeve carried by said rear wall and extending axially forwardly into said spring chamber, said sleeve defining a cylindrical socket having an open rear end and a centrally apertured shoulder through which the threaded member is received, and a nut in said socket threaded onto said threaded member, the fluid pressure actuator being characterized in that said nut is provided with a cylindrical outer bearing surface rotatably and slidably engaging the wall of said socket, and is also provided with a tool receiving member accessible through the open rear end of said socket to effect rotation of said nut against said shoulder to retract said threaded member and said movable wall against the opposing force of said spring.

2. A fluid pressure actuator according to claim 1, characterized in that said actuating member has an open ended axial passage extending therethrough, and in that said threaded member has an axial extension extending forwardly through said axial passage to the outer end of said actuating member, said outer end comprising a noncircular recess in which is received a complementary noncircular part of the outer end of said extension, whereby said threaded member is fixed against rotation with respect to said movable wall.

* * * * *